June 5, 1951 T. J. McINTYRE 2,555,452
GAS DISTILLATE TRAP
Filed Feb. 17, 1947 3 Sheets-Sheet 2

Inventor
Tillman Jones McIntyre

By Clarence A. O'Brien
and Harvey B. Jacobson
Attorneys

June 5, 1951 T. J. McINTYRE 2,555,452
GAS DISTILLATE TRAP
Filed Feb. 17, 1947 3 Sheets-Sheet 3

Inventor
Tillman Jones McIntyre

By Clarence A. O'Brien
and Harvey B. Jacobson
Attorneys

Patented June 5, 1951

2,555,452

UNITED STATES PATENT OFFICE 2,555,452

GAS DISTILLATE TRAP

Tillman Jones McIntyre, Crowley, La.

Application February 17, 1947, Serial No. 729,012

8 Claims. (Cl. 183—2.7)

1

This invention resides in novel and useful improvements in gas distillate traps and more specifically pertains to a safety device for shutting down a gas well upon breakage of the gas flow line therefrom.

The principal objects of this invention are to provide a device which will operate as a safety device to shut in a gas well upon failure or rupture of the gas delivery line therefrom; which will also serve to function as a gas distillate or separator trap; which is provided with automatic means for discharging the condensate collecting in said trap; which may be manually operable to shut off the flow of a gas well; wherein means is provided for shutting off the flow of a gas well in response to collection of a predetermined amount of fluid in the distillate trap; wherein novel and efficient means are provided for controlling the flow of gas from a well to the gas delivery line thereof; wherein an improved control valve is provided for regulating the flow of gas to said gas delivery conduit; wherein a novel form of liquid condensate drainage valve is provided; wherein a balanced pressure valve construction is provided for controlling the liquid drainage from said trap; wherein a novel and efficient form of filter means is provided for the gas outlet from said trap; and wherein a highly efficient dependable and durable attachment is provided which is capable of use with any type of flowing gas well and is withal inexpensive in construction.

These, together with various ancillary objects of the invention which will later become apparent as the following description proceeds, are realized by this device, one embodiment of which has been illustrated, by way of example only in the accompanying drawings, wherein.

Figure 1:
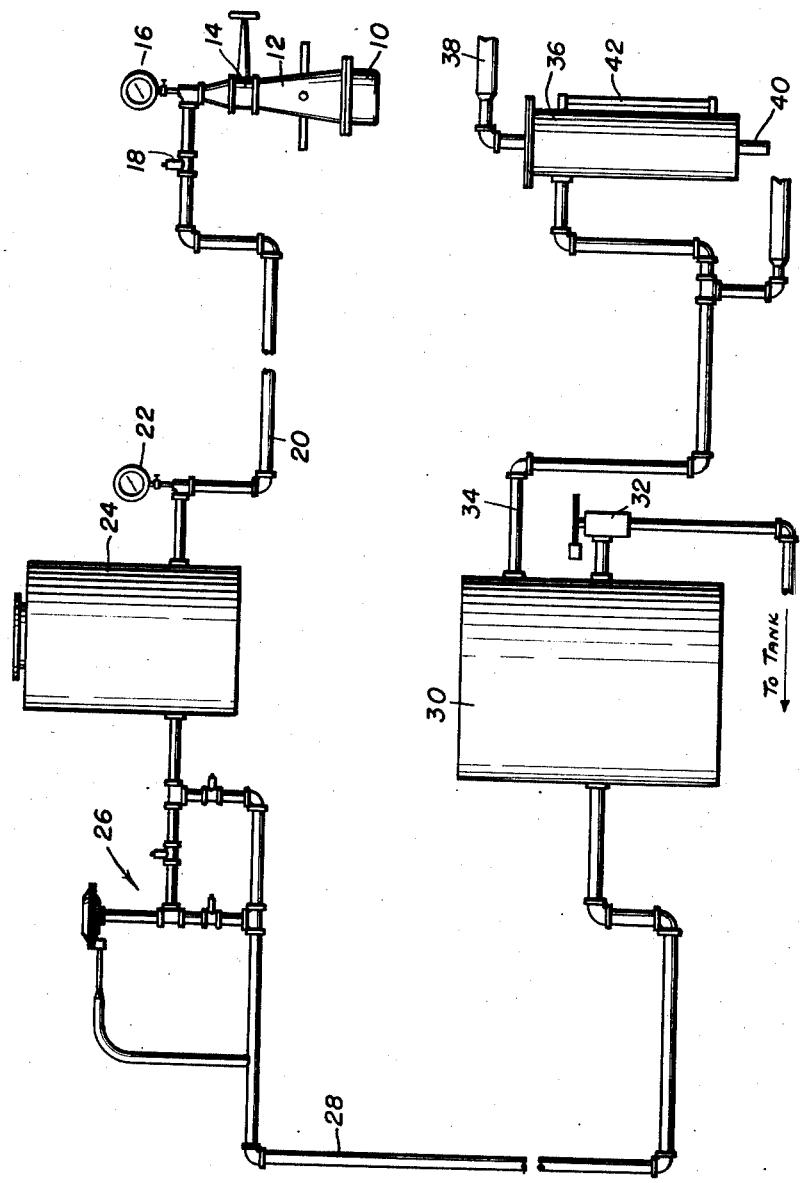
Figure 1 is a diagrammatic view of a suitable form of gas well flow lines with conventional mechanisms associated therewith, and to which this invention may be applied.

Attention is now directed to the accompanying drawings, wherein like numerals indicate similar parts throughout the various views and particularly to Figure 1 showing in diagrammatic form a conventional type of gas well flow line. The numeral 10 designates generally the well casing of any conventional type of gas well, which is provided with a detachable well cap 12

2 and a master control valve for controlling the output of the gas well. A suitable gauge 16 is connected to the valve 14 for indicating the flow pressure delivered by the well, and connected therewith is a pressure relief or safety valve 18 of known type. The aforementioned elements of the flow line are connected by a conduit 20 with a flow line gauge 22 and a conventional type of heater 24 which by suitable conduits is connected to Fisher regulator for controlling the flow and output of the well. This latter device is of known design and function to regulate the flow of the well to maintain a constant pressure between predetermined minimum and maximum limits of pressure in a flow line 28. When the maximum pressure on the downstream side of the regulator valve exceeds the predetermined set maximum, the device operates to close and shut off the flow of gas from the well to the flow line. Within the predetermined limits, the device operates to supply more or less gas from the well to maintain a predetermined relatively constant pressure in the flow line.

The conduit 28 is connected with a conventional form of separator 30 which functions to collect and remove oil or other liquid entrained by the flowing gas from the well, and to periodically discharge as by means of a valve control line 32 said accumulated liquid to suitable storage tanks, not shown. The gas, separated by the separator 30, is conducted by the line 34 to the novel gas distillate trap and safety device 36 forming the subject of this invention, from which the gas is delivered by a conduit 38 constituting a flow delivery line of the well and which may extend for a distance of several miles to deliver the gas to any suitable point of use. It may be here noted that the aforementioned arrangement occupies a relatively smaller length of flow line, such as about five hundred feet.

The gas distillate trap 36 is provided with a liquid discharge line 40 and a sight gauge 42 for indication by visual inspection the height of the liquid contained in said trap.

The aforementioned system is one of a conventional and known type except for the presence of the gas distillate trap 36 to be now described. The addition of the trap has the dual function of providing a safety device and constituting a second gas and liquid separator, together with various ancillary functions to be later set forth.

Figure 2:
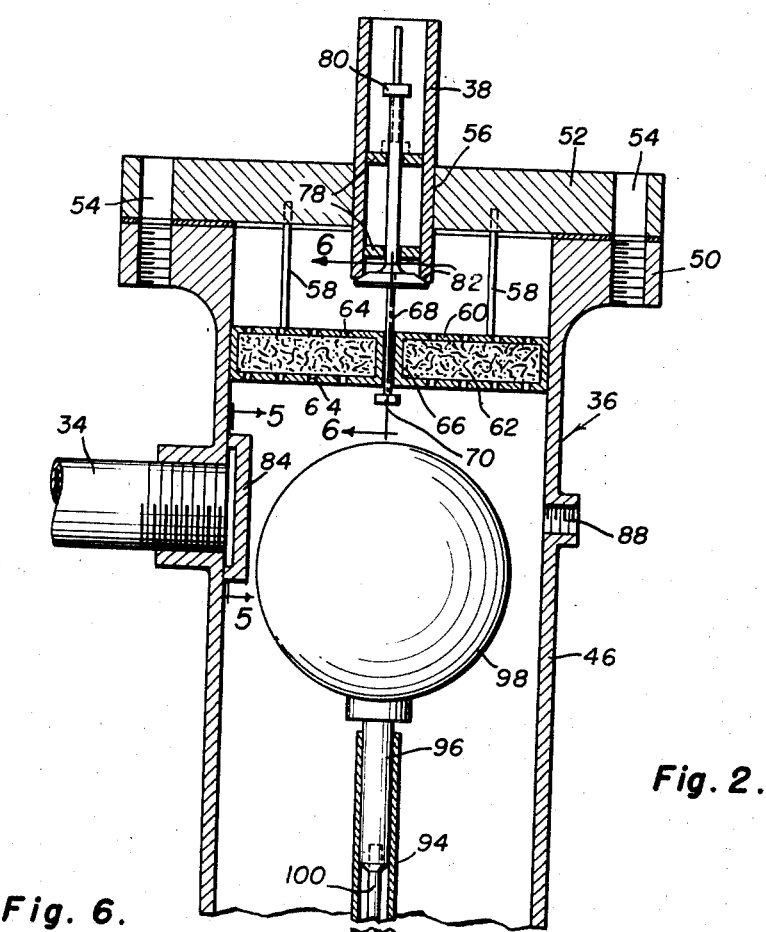
Figure 2 is a central vertical sectional view through the gas distillate trap forming the subject of this invention.
Figure 4:
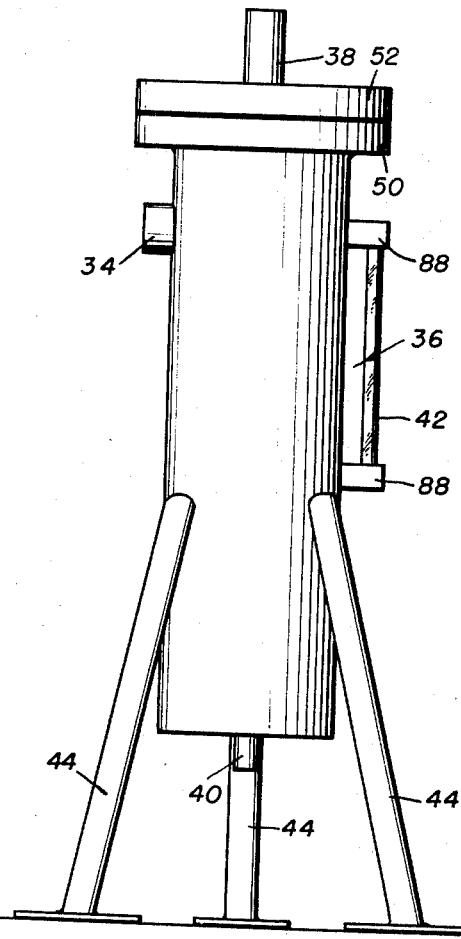
Figure 4 is an elevational view of the gas distillate trap of Figure 2.

As shown best in Figure 4, the trap 36 consists of a preferably metallic cylinder which is supported upon suitable tripod legs 44. As shown in Figure 2, the trap comprises cylindrical walls 46 having an integral base portion 48 at its lower end and an enlarged and strengthened boss 50 at its upper end upon which is seated a head member 52 which is detachably secured thereto as by suitable fastening means 54.

Removably and axially disposed through the head member 52, is a gas outlet conduit 56 to which is connected the gas flow line 38. Supported and depending from the head plate 52 as by a plurality of supporting arms 58, is a filter member 60 which constitutes a horizontal partition in the upper end of the cylinder 46. This cylinder is composed of an annular drum which is filled with any suitable packing means as indicated at 62 to comprise a filter for the gas entering the distillate trap 36 through the inlet gas pipe 34 and leaving the trap through the outlet 56. Upon both its upper and lower surfaces, the filter 60 is provided with a plurality of foraminations or apertures 64 to permit an even flow of gas therethrough over the entire cross-sectional area of the filter. Disposed axially of the filter 60 and of the passage 56, is a suitable bore 66 constituting a guide extending through the filter and slidably receiving in guided relation the valve actuating rod 68 having an enlarged head 70 at the lower side thereof for a purpose to be subsequently set forth.

Figure 6:
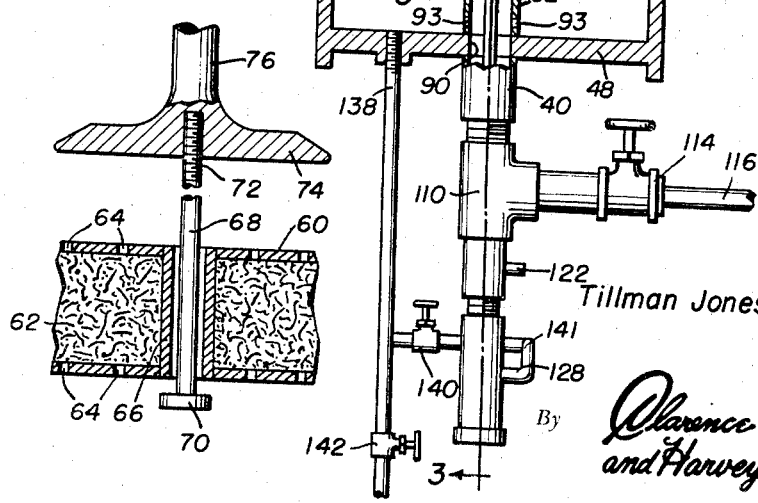

As shown best in Figure 6, the upper end of the actuating rod 68 is screw-threaded as at 72 for engagement with a corresponding axial bore in the head 74 of a gas outlet valve whose stem 76 is slidably received in the passage 56 in guided relation by spaced guides 78 therein. At the upper end of the valve stem 76, is a collar 80 which may be longitudinally adjusted upon the valve stem and which is intended to limit the amount of opening movement of the valve 74 from the valve seat 82 formed upon the inner termination of the conduit 38.

It may be here noted that it is intended that the valve be disposed in a vertical position, and downwardly opening from the seat 82, and that the valve will be normally open by reason of the effect of gravity thereon; and that it is contemplated that in response to a sufficient velocity of flow through the outlet conduit 38, the valve will be closed by this flow and thereby shut off delivery of gas to the gas delivery line 38, in a manner to be subsequently set forth.

Figure 5:
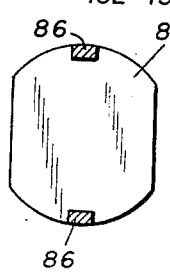
Figure 5 is a detailed view in vertical section taken substantially upon the section line 5—5 of Figure 2; and, Figure 6 is an enlarged fragmentary detailed view and taken in vertical section substantially upon the section line 6—6 of Figure 2.

The gas inlet conduit 34 enters the chamber formed in the cylindrical member 46 at a point disposed below the filter member 60, and across its orifice is provided with a baffle 84, shown best in Figure 5, which is attached to the wall of the casing 46 as by a pair of diametrically disposed integral legs 86. This baffle is provided for the purpose of preventing the pressure and velocity of the incoming gas from directly impinging upon any apparatus within the casing 46, and also for the purpose of causing a liquid entrained thereby to be condensed upon the baffle and dropped into the chamber within the casing.

Preferably diametrically opposite the gas inlet conduit 34, the casing is provided with suitable bosses having threaded bores 88 for receiving the visual liquid gauge 42 above mentioned.

Preferably centrally disposed through the base member 48, is an aperture 90 constituting the fluid condensate outlet opening for the chamber within the casing 46 which aperture is surmounted by a bushing or sleeve 92 attached thereto in any suitable manner and provided adjacent its lower surface with a plurality of ports 93 for permitting the inflow of liquid into the sleeve 92 from the interior of the casing 46. A sleeve 94 constituting a guide sleeve rises from the upper end of the bushing 92 to a suitable height within the casing 46.

A float 98 of any suitable size, shape and material, has a guide rod 96 secured thereto, which guide rod is slidable within the guide bushing 94 and is rigidly attached at its lower end to a liquid discharge valve stem 100.

Figure 3:
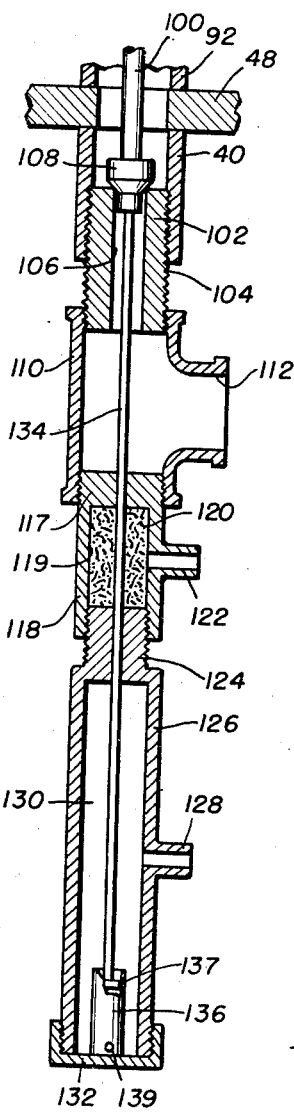
Figure 3 is a detail in vertical sectional view taken substantially upon the line 3—3 of Figure 2.

As shown more clearly in Figure 3, the base plate 48 has secured therebeneath in a manner to surround the discharge opening 90, a discharge conduit 40 which receives by screw-threaded engagement the tubular sleeve or bushing 102 being externally screw-threaded as at 104 and provided with an internal axial bore 106. The upper end of this bore terminates in a valve seat which is engageable by a poppet type of valve 108 carried by the lower end of the valve rod 100. The bushing 102 screw-threadedly engages a conduit of a T-coupling 110 having a discharge elbow 112 for a purpose to be later set forth. As shown in Figure 2, the elbow 112 is connected to a manually operable control valve 114 and by a conduit 116 with suitable liquid condensate storage tanks, not shown.

At its lower end, the T 110 receives an externally screw-threaded member 117 constituting a plug and provided with a depending skirt portion 118 and an internal bore 119 adapted to receive a packing material 120, while a laterally disposed elbow 122 provides means for supplying lubricant to the packing 120 as desired.

The lower end of the bore 119 is closed by an externally threaded closure plug 124 having a depending cylindrical member 126 which is apertured intermediate its ends as at 128 for a purpose to be later set forth and is provided with an interior chamber 130 closed at its lower end as by a closure cap 132. Carried by the lower end of the valve 108, is a depending rod 134 which extends through the discharge passage 106, the hollow T-coupling 110, axial bores in the plugs 117 and 124, through the packing 120 and into the chamber 130, and at its lower end extends into a cylindrical member 136 carried by the cap 132. Preferably, the rod 134 terminates in a piston 137 slidable in the cylinder 136, which is provided with pressure inlet ports 139 at the lower end thereof.

As shown in Figure 2, a drainage conduit 138 communicates with the interior of the trap 46 and is connected by a manual control valve 140 and conduit 141 with the above mentioned apertured boss 128. At its lower end, the drainage line 138 is provided with a manually operable drainage valve 142 and from this extends to any suitable drainage collection means, not shown.

The operation of the gas distillate trap as so far described, is as follows. Gas, containing any entrained liquid, is discharged from the conduit 34 against the baffle 84 and into the interior of the casing 46. The liquid distillate or condensate is collected and accumulates in the lower end of the chamber 46 above the partition 48, being retained therein by the normally closed liquid discharge valve 108 engaging its seat upon the bushing 102. The gas entering the chamber rises through the filter member 60 and is discharged through the normally open gas discharge valve 74 through the gas flow conduit 38. Any liquid entering the chamber within the casing 46 freely flows by means of the apertures 93 and sleeve 92 into the liquid discharge conduit 40 and accumulates above the valve 108 therein. When the liquid has reached a predetermined height in the casing 46, the float 98 is lifted thereby to elevate the valve rod 100 and raise the valve 108 from its seat, thereby permitting the discharge of liquid condensate from the casing 46 past the valve 108, through the bore 106 in the bushing 102, into the T-coupling 110 and by means of the elbow 112, valve 114 and conduit 116 to suitable liquid collection tanks, not shown.

If for any reason, the condensate is unable to discharge from the casing 46, as by reason of the collection tanks being full, or the valve 114 being closed as set forth hereinafter, the liquid rises until the float 98 rises above its normal valve discharge position, until it engages the head 70 on the valve actuating rod 68, and thereby urges the valve 74 into seated position upon the seat 72. As soon as the valve seats, the accumulated pressure in the chamber of the casing 46 rises above the predetermined maximum flow pressure of the regulator valve, and this back pressure upon the regulator valve instantly causes the latter to cut off the flow of gas from the well, thereby stopping all flow of gas.

A somewhat similar situation prevails if for any reason the gas delivery flow line 38 should be ruptured on the downstream side of the safety device 36. In this event, the sudden and complete release of back pressure in the casing of the distillate trap permits an increase of the rate of flow from the conduit 34, which rate of flow immediately closes the valve 74 against its seat 82 to cause the Fisher regulating valve to shut in the well in the manner aforementioned. As will be understood, proper adjustment of the collar 89 upon the valve stem 76 will permit adjusting the amplitude of movement of the valve 74 from its seat, and thereby determine the pressure or rate of flow which will urge the valve to its seat.

In some instances, it may be desired to manually shut off the flow of the gas well and for this purpose the manually operable valve 114 may be closed, causing the liquid level to rapidly rise in the casing 46 until the float 98 is lifted to a position to actuate valve operating head 70, close the valve 74 and cause the Fisher regulating valve to shut in the well in the manner above described.

By means of the drainage line 138 and valve 142, the distillate trap may be drained and sediment removed therefrom periodically as desired. By means of the valve 140, the pressure prevailing within the chamber of the casing 46 may be continuously applied by means of conduit 141 and apertured elbow 128 to the interior of the chamber 139. This pressure is communicated by the ports 139 into the cylinder 136, and acting upon the lower surface of the piston 137 urges the rod 134 upwardly against the valve 108. The area of the piston 137 is so chosen that this pressure substantially counterbalances the pressure applied to the valve 108 by means of the pressure prevailing in the chamber of the casing 46. Thus, the float merely has to lift the weight of the valve 108 and the associated valve rod, without having to overcome the pressure of the casing 46 which tends to close the valve and maintain it on its valve seat.

From the foregoing, it is believed that the manner of operating and constructing this device will be readily understood, and since various modifications will occur to those skilled in the art from a perusal of the foregoing specification and drawings, it is not desired to limit the invention to the exact construction shown and described, but all suitable modifications and equivalents may be resorted to within the scope of the appended claims.

I claim:

1. A gas distillate trap comprising a chamber, gas inlet, gas outlet and liquid outlet ports for said chamber, a float controlled valve for said liquid outlet port, a normally open valve for said gas outlet port, means spaced from said float for closing said gas outlet valve in response to predetermined upward movement of said float, a liquid by-pass from said chamber, and means associated with said by-pass for counterbalancing pressure from said chamber upon said float controlled valve.

2. The combination of claim 1 and means for adjusting the extent of opening of said gas outlet port.

3. The combination of claim 1 wherein said closing means includes a rod secured to said normally open valve and an abutment on the free end of said rod normally spaced from said float and engageable therewith for closing said valve.

4. The combination of claim 3 and means for adjusting the extent of opening of said gas outlet port.

5. The combination of claim 4 and a gas filter in said chamber having an aperture for slidably and guidingly receiving said rod.

6. The combination of claim 1 wherein said last-named means includes a housing in communication with said liquid outlet port and said by-pass, a rod secured to said float controlled valve extending into said housing, a manually operable valve in said by-pass, and means responsive to the pressure in said by-pass for actuating said rod and urging the float controlled valve against pressure in said chamber.

7. The combination of claim 6 wherein said pressure responsive means includes an apertured cylinder in said housing and a piston on the free end of said rod slidable in said cylinder.

8. A gas distillate trap comprising a casing having an open upper end, said casing having gas inlet and liquid outlet ports therein, a cover for said casing having a gas outlet port therein, a valve for said liquid outlet port and a float disposed in said casing and controlling said liquid outlet valve, valve means for said gas outlet port responsive to a predetermined rate of flow of gas through said gas outlet port for selectively closing said gas outlet port, a gas filter attached to said cover below said gas outlet port and slidably received in said casing, said filter having a transverse bore extending therethrough, an actuator rod carried by said valve means and slidably and guidably extending through said bore, the free end of said rod normally terminating in vertical spaced relation to said float, said float engaging said free end of said rod in response to a predetermined upward movement of said float to close said gas outlet port.

TILLMAN JONES McINTYRE.

REFERENCES CITED

The following references are of record in the file of this patent:

UNITED STATES PATENTS

| Number | Name | Date |
|---|---|---|
| 251,726 | Mueller et al. | Jan. 3, 1882 |
| 286,326 | Maxson | Oct. 9, 1883 |
| 484,526 | Valentine | Oct. 18, 1892 |
| 1,045,693 | Gillman | Nov. 26, 1912 |
| 1,521,386 | Neill | Dec. 30, 1924 |
| 1,631,454 | Bambach et al. | June 7, 1927 |
| 1,674,699 | Overstrom | June 26, 1928 |
| 1,941,030 | Williams | Dec. 26, 1933 |
| 2,177,330 | Pressler | Oct. 24, 1939 |

FOREIGN PATENTS

| Number | Country | Date |
|---|---|---|
| 4,785 of 1890 | Great Britain | Mar. 27, 1890 |